United States Patent [19]
Solberg

[11] 3,893,617

[45] July 8, 1975

[54] FAILURE DETECTING SYSTEM FOR DEVICES EMPLOYING DIGITAL PARALLEL-TO-SERIES CONVERTERS

[75] Inventor: Björn Ragnar Solberg, Oslo, Norway

[73] Assignee: International Standard Electric Corporation, New York, N.Y.

[22] Filed: Apr. 22, 1974

[21] Appl. No.: 462,704

[30] Foreign Application Priority Data

July 11, 1973 Italy .................................. 26438/73

[52] U.S. Cl. ............................................. 235/153 A

[51] Int. Cl. ........................ G06f 11/00; H03k 13/32

[58] Field of Search .................... 235/153 A, 153 R; 340/146.1 AB, 347 DD; 307/232, 233

[56] References Cited

UNITED STATES PATENTS

| | | | |
|---|---|---|---|
| 3,191,153 | 6/1965 | Bratschi et al. | 235/153 A |
| 3,320,440 | 5/1967 | Reed | 235/153 A |
| 3,577,123 | 5/1971 | Taylor et al. | 340/146.1 AB |
| 3,612,907 | 10/1971 | Braunholtz | 235/153 A |
| 3,832,684 | 8/1974 | Besenfelder | 340/146.1 AB |

*Primary Examiner*—Charles E. Atkinson
*Attorney, Agent, or Firm*—John T. O'Halloran; Menotti J. Lombardi, Jr.; Alfred C. Hill

[57] ABSTRACT

This invention relates to a system for detecting abnormal conditions in devices employing digital parallel-to-series converters. The system includes a digital storing device connected to the output of the converter which upon failure provides a constant logical level for a period longer than a certain threshold time.

2 Claims, 7 Drawing Figures

FAILURE DETECTING SYSTEM FOR DEVICES EMPLOYING DIGITAL PARALLEL-TO-SERIES CONVERTERS

BACKGROUND OF THE INVENTION

This invention relates to parallel-to-series converters and more particularly to a system to detect failures of these converters.

Various methods can be used to convert digital parallel signals into series signals. Some examples of parallel-to-series converters are shown in FIGS. 1*a*, 1*b* and 1*c*.

FIG. 1*a* shows a very simple device, which requires that the input signals $S_1$, $S_2$ . . . Sn are in a synchronous and isochronous relationship with the output signal SU. Therefore, no store has to be provided.

FIG. 1*b* shows a more general case in which the input signals $S_1$, $S_2$, . . . $S_n$ are stored in buffer stores 5, 6 and 7 before they are serialized. The input signals $S_1$, $S_2$ . . . $S_n$, must have a certain relationship regarding phase and frequency, but do not have to be isochronous.

FIG. 1*c* shows a case in which the signals $S_1$, $S_2$ . . . $S_n$ are serialized by means of an *n*- stage shift register.

FIG. 2 shows an example of possible waveforms occuring when one or more of the input signals have a constant value equal to logical 0 or 1. FIG. 2 shows more specifically the case when channel number 2 has the logical value 0. Similar results are attained in most cases when a failure of a device associated to one of the *n* channels occurs. The circuitry involved in the serialization may also cause similar waveforms at the output, if a failure should occur in any of these devices, for example, AND gates 1, 2, 3 in the example shown in FIG. 1*a*, the buffer stores or flip-flops 5, 6, 7 and the AND gates 8, 9, 10 shown in FIG. 1*b*, the bistable stages 12, 13, 14 and 15 of the shift register as shown in FIG. 1*c*.

More particularly, bearing in mind that most of the failures (abnormal modes) are of such a nature that it simulates a constant logical 0 or 1 at the output of the circuit concerned, the most probable result of a failure in a circuit element will be that one or more of the *n* positions of the output signal will stay in a fixed logical 0 or 1.

One obvious way of detecting faults occuring in the input signals or in the circuitry involved for serialization is to provide a detector for sensing transient signals at the output of the last circuitry element associated with each input signal. This method is feasible when the statistical features of the input signal are known. The method involves suitable circuitry associated with each input signal, thus the system is uneconomical and unreliable especially when the number of input signals (*n*) is high.

Another approach is to detect periodicities of the logical 0 or 1 states which occur in the output signals when a circuit device has a failure. This may be done by filtering the serialized signals suitably. Since a fault in any channel will give a periodicity of the output signal with a fundamental frequency of $f_o/n$, where $f_o$ is the digit rate of the output frequency and *n* is the number of input signals, a filter with center frequency $f_o/n$ and a suitable bandwidth is able to detect such periodicities. The disadvantage of such a system is that its practical implementation will require much analog circuitry some of which may be critical.

SUMMARY OF THE INVENTION

An object of the present invention is to provide a new system for detecting abnormal conditions in parallel-to-series converters.

The invention may be employed in the following cases: (1) synchronous serializing devices; (2) asynchronous serializing devices; (3) synchronizing devices of the so-called pulse stuffing type; (4) desynchronizing devices of the so-called pulse-stuffing type; (5) antijittering devices (for eliminating phase variations); (6) multiplexing devices; and (7) any device using parallel-to-series converters.

A feature of the present invention is the provision of a system for detecting abnormal conditions in devices employing digital parallel-to-series converters comprising: a digital store connected to the output of each of the devices, the store producing a constant logical level for a period longer than a certain threshold time upon occurrence of any one of the abnormal conditions.

BRIEF DESCRIPTION OF THE DRAWING

Above-mentioned and other features and objects of this invention will become more apparent by reference to the following description taken in conjunction with the accompanying drawing, in which.

DESCRIPTION OF THE PREFERRED EMBODIMENTS

Figure 1B:
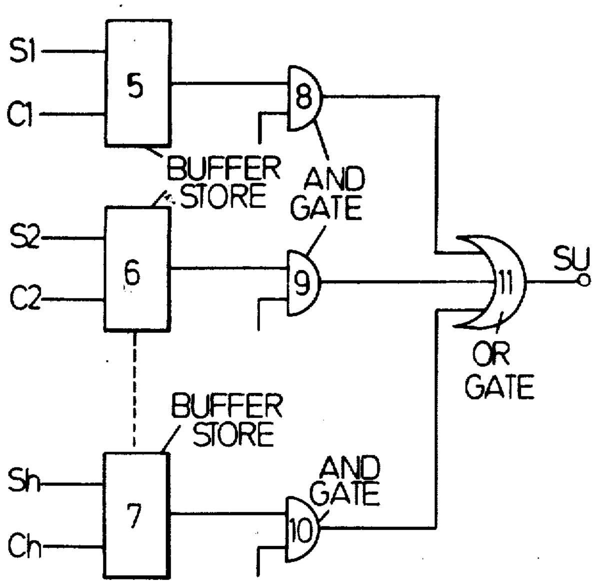
FIGS. 1*a*, 1*b* and 1*c*, are block diagrams of three different parallel-to-series converters discussed hereinabove under the heading "Background of the Invention"
Figure 1A:
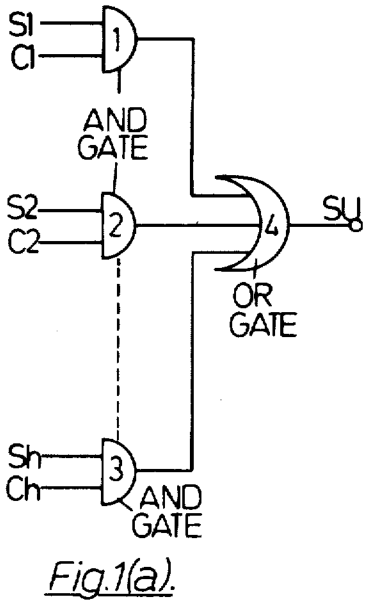
Figure 1C:
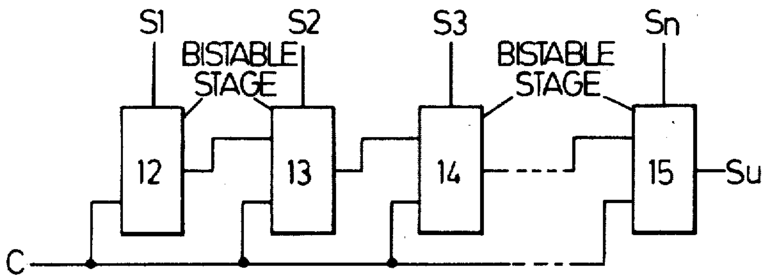
Figure 2:
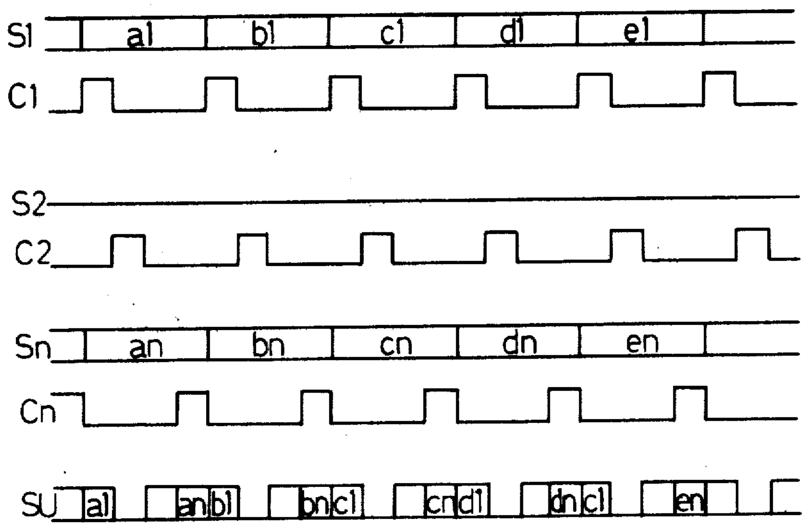
FIG. 2 illustrates possible waveforms when one or more input signals have a constant value equal to logical 0 or 1 discussed hereinabove under the heading "Background of the Invention"
Figure 3:
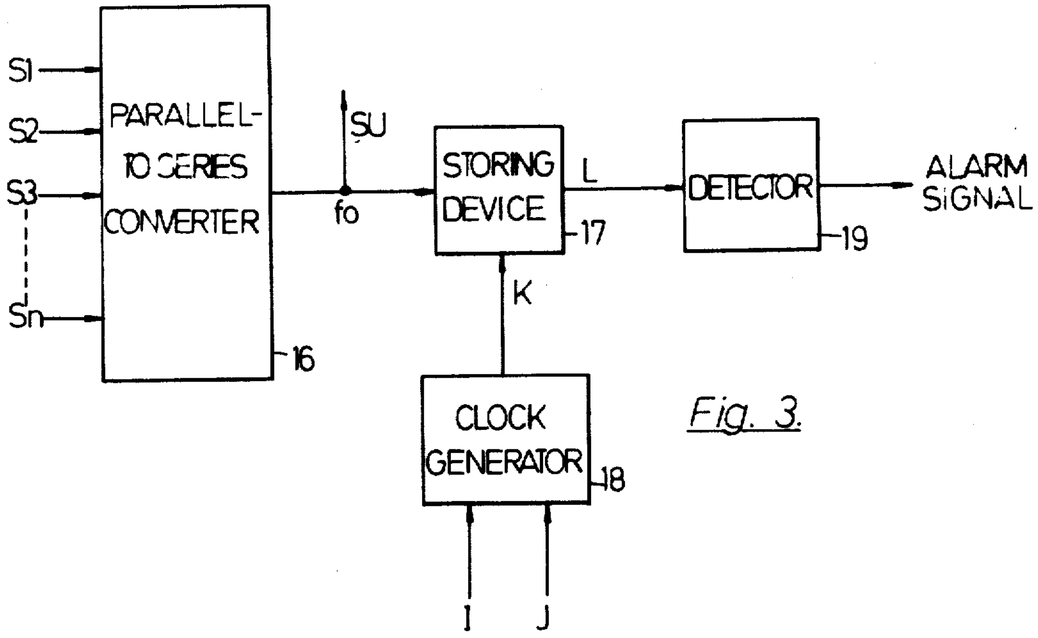
FIG. 3 illustrates a block diagram of the detecting system in accordance with the principles of the present invention.

Reference is now made to FIG. 3. The existence of (abnormal) modes of the type referred to above causes the output signal to contain periodicities with period $n/f_o$, where $f_o$ is the digit rate at the output of the parallel-to-series converter, and *n* is the number of signals at the input which is equal to the number of channels and the number of buffer stores used in the conversion operation. Such a mode is detected as follows.

The output signal of the parallel-to-series converter 16 is fed to a storing device 17, (e.g., a flip-flop) in which information is read in at times determined by clock signals *K*. These signals norminally read in information each $n/f_o$ second (or generally $X(n/f_o)$, where *X* is any integer). After having read N bits at that rate the time interval between two pulses changes to $n+k/f_o$), where *k* is a suitable integer, positive or negative.

The time interval between the following N pulses is again $n/f_o$ seconds. The generation of the clock signal K having the above properties takes part in clock generator 18 which has as input signals I which may simply be the clock signal at the $f_o$ rate, and J which is a pulse pattern determining the violation rate, that is, when the clock signal K is breaking its nominal rate. Violations may or may not occur periodically.

The effect of these forms of clock signals K is that the signals L at the output of the storing device 17 for the time $T$ will be replicas of the equivalent signals just before serializing in one of the n channels, where $T$ is the violation rate. The output will be a replica of a new channel every time a violation has occurred. If one of the channels, or one of the input signals are faulty, this will be noted by a continuous logical 0 or logical 1 lasting for $T$ seconds at the output of device 17. This signal will be repetitive by a period of $nT$, (assuming that the violations occur periodically).

Detector 19 detects the presence of a logical 0 or 1 lasting longer than a certain threshold value.

Figure 4:
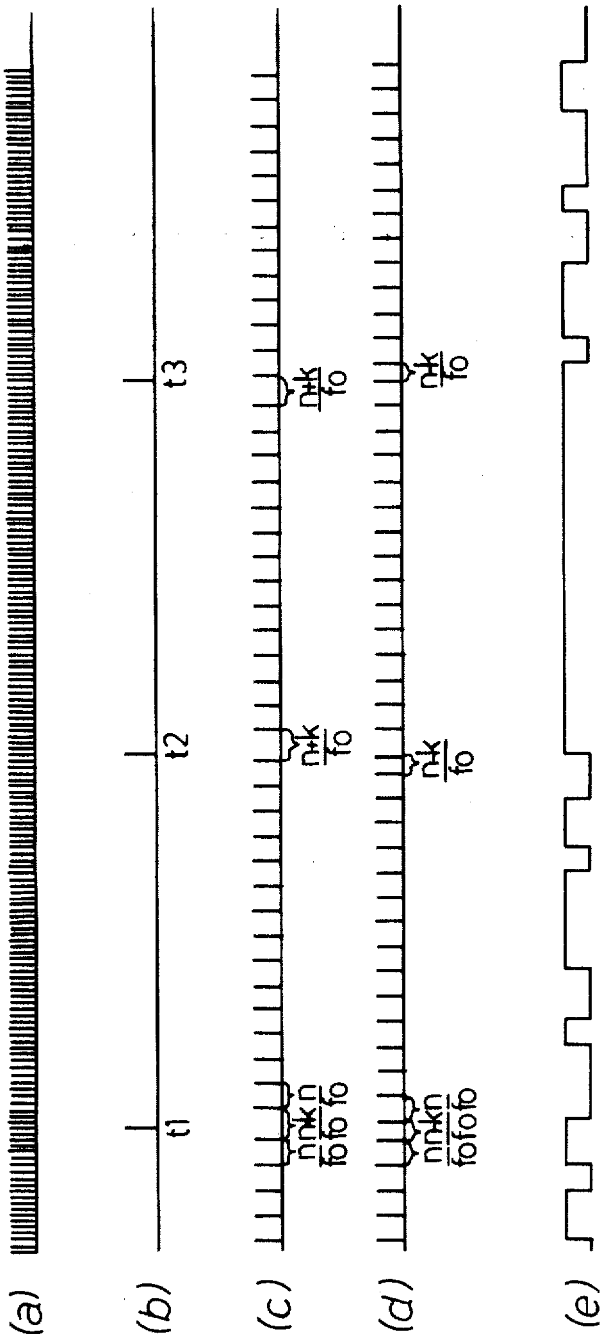
FIG. 4 illustrates waveforms useful in explaining the detecting system of the present invention.

In FIG. 4 are shown hypothetical waveforms as an example. In Curve 4*a* is shown simply the clocking rate $f_o$. In Curve 4*b* is shown the violation pulses generated from input J, Curve 4*c* shows the clocking instant of $K$ when the violation causes the period between two violating pulses to be longer than the nominal period, and Curve 4*d* shows the corresponding clocking instants of $K$ when the period between two violating pulses is shorter than the nominal period. Curve 4*e* shows a possible output of storing device 17. Between $t_1$ and $t_2$ the signals are replicas of one of the n input signals, say Si. Assume 4*c* is the clocking instant. At $t_2$ we have a violation, and between $t_2$ and $t_3$ the signals at the output are replicas of the equivalent signals in channel Si+1. If the input $Si+1$ is constant, or one of the circuit elements in this channel is faulty the output will be constant between $t_2$ and $t_3$. This is illustrated as a logical 1 in Curve 4*e*. At $t_3$ the output will start to be replicas of signals in channel $Si+2$, which in our example is assumed to be operating correctly.

An obvious condition for the system is that the time $T$ is taken to be so large that the probability for having any of the signals $S_1, S_2 \ldots S_n$ at a constant logical level over the period is sufficiently small.

Figure 5:
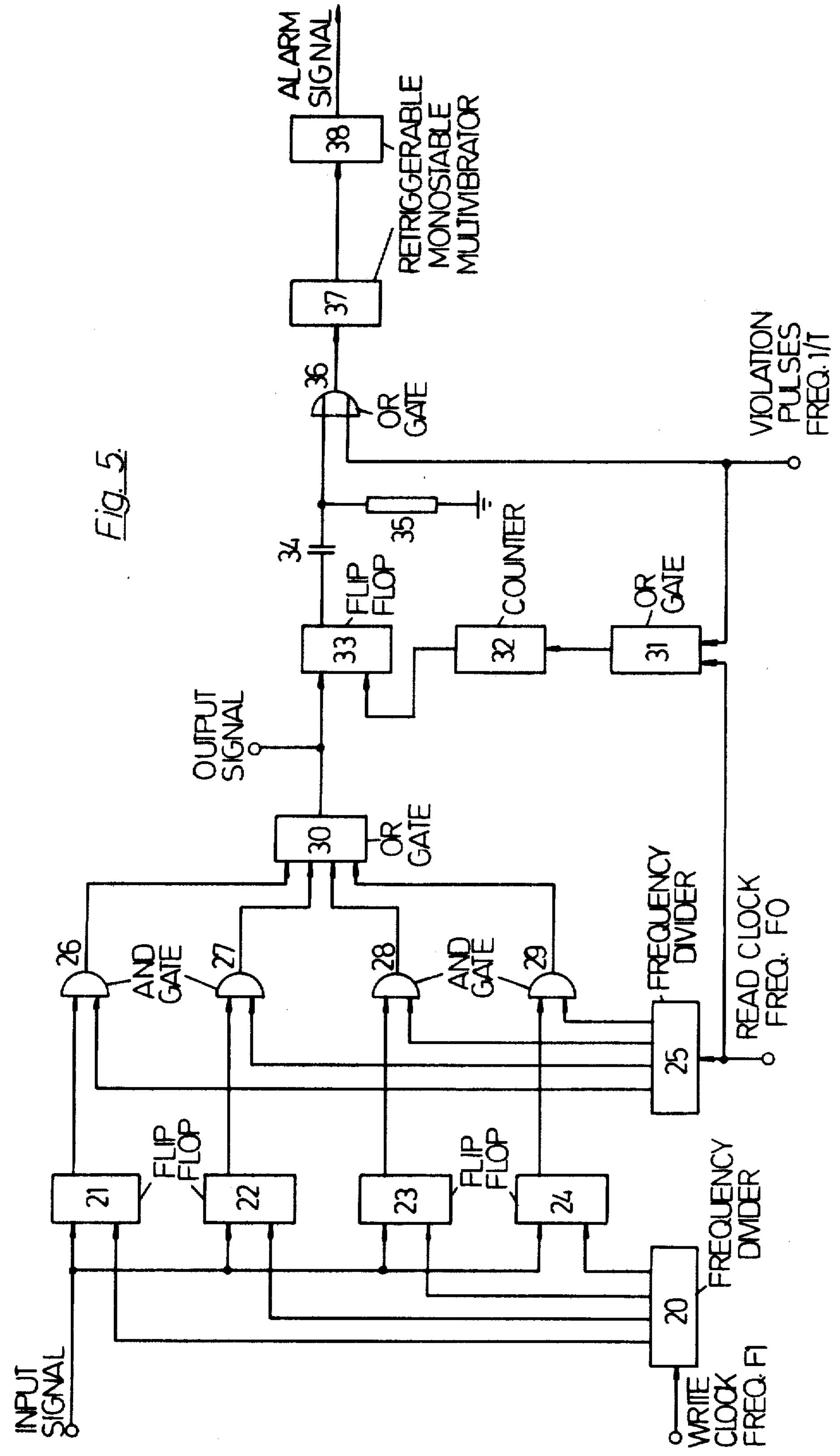
FIG. 5 illustrates a particular embodiment in accordance with the principles of the present invention.

Reference is made now to FIG. 5. This figure illustrates a particular embodiment of the present invention, which has been generally described heretofore. In the embodiment concerned the invention is applied to a jitter reduction device, comprising the frequency divider 20, the flip-flops 21–24, the frequency divider 25, the AND-gates 26–29 and the Or-gate 30. The input signal and the relative writing clock at the digit frequency $f_1$ are applied to the input of the flip-flops 21–24 and to the divider 20, respectively, the latter generating pulses which control the operation of writing the signal into flip-flops 21–24. Reading the signals from flip-flops 21–24 is controlled by means of frequency divider 25 controlled by the reading clock at the frequency $f_o$. Thus, the digit rate of the output signal is $f_o$. The OR gate 31 is used to add to the clock at the rate $f_o$ the short violation pulses at frequency $1/T$. The output of gate 31 is used to clock the counter 32 which divides by four. The output of counter 32 is used to clock information into the flip-flop 33. The capacitor 34 and the resistor 35 form a differentiator circuit yielding short positive pulses at the input of the OR gate 36 when the output of flip-flop 33 goes from low to high level. The short violation pulse is tied to the other input of OR gate 36, assuring that the output will contain at least one pulse each T second, even if there is a permanent logical level at the output of flip-flop 33. The output of the OR gate 36 is used to trigger the retriggerable monostable multivibrator 37. The time constant of this multivibrator is chosen large enough so that the multivibrator always is retriggered before it falls back to its quiescent state when the circuit is in its normal operation. The time constant is smaller than $T$, so that when an abnormal mode of the above referred type occurs, multivibrator 37 will fall back to its quiescent state. In the normal operation, the output of the multivibrator 37 is a permanent low voltage, but for abnormal mode the output will consist of positive pulses with period $4T$, $2T$ or $T$. These pulses are used to trigger another retriggerable monostable multivibrator 38, which has a time constant larger than $4T$. If the system is operating in its normal mode multivibrator 38 will remain untriggered and the output will be logical 0. When an abnormal mode occurs it will always be triggered and a permanent logical 1 occurs. This is taken as the alarm signal.

While I have described above the principles of my invention in connection with specific apparatus it is to be clearly understood that this description is made only by way of example and not as a limitation to the scope of my invention as set forth in the objects thereof and in the accompanying claims.

I claim:

1. A system for detecting abnormal conditions in a digital parallel-to-series converter comprising:

a digital store connected to the output of said converter, said store storing the output of said converter and producing a constant logical level for a period longer than a certain threshold time upon occurrence of any one of said abnormal conditions;

A clock generator coupled to said store, said generator producing clock pulses to clock said store and to cause said store to produce said constant logic level upon occurrence of any one of said abnormal conditions, said clock pulses having a nominal period of $Xn/f_o$, where n equals the number of parallel input channels, $f_o$ is the digit rate of serialized data and $X$ is any positive integer, with the time period between two successive ones of said clock pulses being instantaneously shifted to $Xn/f_o + k/f_o$, where k is a positive or negative integer, and the time between said shifts may occur periodically or nonperiodically as long as the time between two of said shifts is larger than a certain minimum value; and a detector coupled to the output of said store to generate an alarm signal upon detecting repeatedly said constant logic level lasting longer than said threshold time.

2. A system according to claim 1, wherein said abnormal conditions cause the output of said store to remain at said constant logical level for a time corresponding to the time between said shifts in the period of said clock pulses clocking said store, and said constant logical level occurring repeatedly at the output of said store at a repetition rate determined by the actual time between said shifts in the period of said clock pulses clocking said store.

* * * * *